(12) United States Patent
Vasseur et al.

(10) Patent No.: US 7,903,584 B2
(45) Date of Patent: Mar. 8, 2011

(54) TECHNIQUE FOR DYNAMICALLY SPLITTING MPLS TE-LSPS

(75) Inventors: Jean-Philippe Vasseur, Dunstable, MA (US); Jeff Apcar, Willoughby (AU)

(73) Assignee: Cisco Technology, Inc., San Jose, CA (US)

( * ) Notice: Subject to any disclaimer, the term of this patent is extended or adjusted under 35 U.S.C. 154(b) by 1397 days.

(21) Appl. No.: 11/327,150

(22) Filed: Jan. 6, 2006

(65) Prior Publication Data

US 2007/0160061 A1  Jul. 12, 2007

(51) Int. Cl.
*H04L 12/28* (2006.01)

(52) U.S. Cl. ......... 370/255; 370/238; 370/252; 370/236; 370/392

(58) Field of Classification Search .................. 370/468, 370/216, 352, 238, 254, 252, 392, 255; 709/223
See application file for complete search history.

(56) References Cited

U.S. PATENT DOCUMENTS

| | | | |
|---|---|---|---|
| 6,111,877 A | 8/2000 | Wilford et al. | |
| 6,370,119 B1 * | 4/2002 | Basso et al. | 370/252 |
| 6,473,424 B1 | 10/2002 | DeJager et al. | |
| 6,603,765 B1 | 8/2003 | Wilford et al. | |
| 6,665,273 B1 | 12/2003 | Goguen et al. | |
| 6,667,975 B1 | 12/2003 | DeJager et al. | |
| 6,704,795 B1 * | 3/2004 | Fernando et al. | 709/237 |
| 6,778,492 B2 * | 8/2004 | Charny et al. | 370/228 |
| 6,856,991 B1 | 2/2005 | Srivastava | |
| 6,886,043 B1 * | 4/2005 | Mauger et al. | 709/238 |
| 6,956,821 B2 * | 10/2005 | Szviatovszki et al. | 370/237 |
| 6,978,394 B1 | 12/2005 | Charny et al. | |
| 6,980,521 B1 | 12/2005 | Jarvis | |
| 7,292,575 B2 * | 11/2007 | Lemieux et al. | 370/392 |
| 7,302,494 B2 * | 11/2007 | Hayashi et al. | 709/239 |
| 7,319,700 B1 * | 1/2008 | Kompella | 370/400 |
| 7,359,377 B1 * | 4/2008 | Kompella et al. | 370/389 |
| 7,406,033 B2 * | 7/2008 | deBoer et al. | 370/218 |
| 2002/0110087 A1 * | 8/2002 | Zelig et al. | 370/236 |
| 2004/0073650 A1 * | 4/2004 | Nakamura | 709/223 |

(Continued)

OTHER PUBLICATIONS

Y. Rekhter and T. Li, RFC 1771, entitled A Border Gateway Protocol 4 (BGP-4), pp. 1-48, Mar. 1995.

(Continued)

*Primary Examiner* — Ricky Ngo
*Assistant Examiner* — Dewanda Samuel
(74) *Attorney, Agent, or Firm* — Cesari and McKenna, LLP

(57) ABSTRACT

A technique dynamically splits Traffic Engineering (TE) Label Switched Paths (LSPs) in a computer network. According to the novel technique, a head-end node may determine that a TE-LSP to a destination needs to be sized to a larger bandwidth (a "larger" TE-LSP) than currently available over a single path to the destination (e.g., a path that may also be required to meet other constraints, such as cost, delay, etc.). In response, the head-end node may dynamically "split" the larger TE-LSP, and create a first split TE-LSP over a best (e.g., shortest) available path (e.g., that meets other constraints). The first split TE-LSP may reserve a maximum available bandwidth for that best available path. The head-end node may then continue recursively creating subsequent split TE-LSPs for any remaining bandwidth of the larger TE-LSP over available paths until the larger TE-LSP may no longer be split (e.g., all bandwidth has been placed, configurable maximum number of splits reached, etc.). Notably, the split TE-LSPs may be "re-groomed" at a later time to recombine and reorganize the split TE-LSPs.

31 Claims, 8 Drawing Sheets

U.S. PATENT DOCUMENTS

| | | | |
|---|---|---|---|
| 2004/0184483 A1* | 9/2004 | Okamura et al. | 370/477 |
| 2004/0205238 A1* | 10/2004 | Doshi et al. | 709/241 |
| 2004/0205266 A1 | 10/2004 | Regal et al. | |
| 2005/0083928 A1 | 4/2005 | Sivabalan et al. | |
| 2005/0083936 A1 | 4/2005 | Ma | |
| 2005/0160171 A1* | 7/2005 | Rabie et al. | 709/227 |
| 2005/0207337 A1* | 9/2005 | Oda et al. | 370/214 |
| 2005/0259586 A1* | 11/2005 | Hafid et al. | 370/241 |
| 2005/0265228 A1* | 12/2005 | Fredette et al. | 370/216 |
| 2006/0018326 A1* | 1/2006 | Yucel | 370/397 |
| 2006/0039364 A1* | 2/2006 | Wright | 370/352 |
| 2006/0067217 A1* | 3/2006 | Li et al. | 370/230 |
| 2007/0101018 A1* | 5/2007 | Shirazipour et al. | 709/238 |

OTHER PUBLICATIONS

Moy, J., RFC 2328, entitled OSPF Version 2, pp. 1-204, Apr. 1998.

Callon, R., RFC 1195, entitled Use of OSI IS-IS for Routing in TCP/IP and Dual Environments, pp. 1-69, Dec. 1990.

Perlman, Radia, Interconnections Second Edition: Bridges, Routers, Switches, and Internetworking Protocols, Sections 12.2.4 pp. 317-319, Addison Wesley longman, Inc. 2000.

Awduche, D. et al., RFC 3209, entitled RSVP-TE: Extensions to RSVP for LSP Tunnels, pp. 1-47, Dec. 2001.

Smit, H., RFC 3784, entitled Intermediate System to Intermediate System (IS-IS) Extensions for Traffic Engineering (TE), pp. 1-13, Jun. 2004.

Katz, D. et al., RFC 3630, entitled Traffic Engineering (TE) Extensions to OSPF Version 2, pp. 1-14, Sep. 2003.

Braden, R. et al., RFC 2205, entitled Resource Reservation Protocol (RSVP)—Version 1 Functional Specification, pp. 1-105, Sep. 1997.

Berger L., RFC 3473, entitled Generalized Multi-Protocol Label Switching (GMPLS) Signaling Resource Reservation Protocol-Traffic Engineering (RSVP-TE) Extensions, pp. 1-40, Jan. 2003.

Vasseur, J.P. et al., Internet Draft, entitled Path Computation Element (PCE) Communication Protocol (PCEP), Version 1 (draft-vasseur-pce-pcep-02.txt), pp. 1-46, Sep. 2005.

Mannie, E., RFC 3945, entitled Generalized Multi-Protocol Label Switching (GMPLS) Architecture, pp. 1-65, Oct. 2004.

Mannie, E. et al., RFC 3946, entitled Generalized Multi-Protocol Label Switching (GMPLS) Extensions for Synchronous Optical Network (SONET) and Synchronous Digital Hierarchy (SDH) Control, pp. 1-25, Oct. 2004.

U.S. Appl. No. 11/121,685, entitled Dynamic TE-LSP Priority and Preemption, by Vasseur et al, on May 4, 2005.

* cited by examiner

TECHNIQUE FOR DYNAMICALLY SPLITTING MPLS TE-LSPS

BACKGROUND OF THE INVENTION

1. Field of the Invention

The present invention relates to computer networks and more particularly to dynamically splitting Traffic Engineering (TE) Label Switched Paths (LSPs) in a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that are operated under different administrative domains. As used herein, an AS, area, or level is generally referred to as a "domain," and a router that interconnects different domains together is generally referred to as a "border router."

An example of an inter-domain routing protocol is the Border Gateway Protocol version 4 (BGP), which performs routing between domains (ASes) by exchanging routing and reachability information among neighboring inter-domain routers of the systems. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol 4 (BGP-4)*, published March 1995.

Examples of an intradomain routing protocol, or an interior gateway protocol (IGP), are the Open Shortest Path First (OSPF) routing protocol and the Intermediate-System-to-Intermediate-System (IS-IS) routing protocol. The OSPF and IS-IS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version 2*, dated April 1998 and the IS-IS protocol used in the context of IP is described in RFC 1195, entitled *Use of OSI IS-IS for routing in TCP/IP and Dual Environments*, dated December 1990, both of which are hereby incorporated by reference.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

To ensure that its routing table contains up-to-date routing information, the intermediate network node may cooperate with other intermediate nodes to disseminate routing information representative of the current network topology. For example, suppose the intermediate network node detects that one of its neighboring nodes (i.e., adjacent network nodes) becomes unavailable, e.g., due to a link failure or the neighboring node going "off-line," etc. In this situation, the intermediate network node can update the routing information stored in its routing table to ensure that data packets are not routed to the unavailable network node. Furthermore, the intermediate node also may communicate this change in network topology to the other intermediate network nodes so they, too, can update their local routing tables and bypass the unavailable node. In this manner, each of the intermediate network nodes becomes "aware" of the change in topology.

Typically, routing information is disseminated among the intermediate network nodes in accordance with a predetermined network communication protocol, such as a link-state protocol (e.g., IS-IS, or OSPF). Conventional link-state protocols use link-state advertisements or link-state packets (or "IGP Advertisements") for exchanging routing information between interconnected intermediate network nodes (IGP nodes). As used herein, an IGP Advertisement generally describes any message used by an IGP routing protocol for communicating routing information among interconnected IGP nodes, i.e., routers and switches. Operationally, a first IGP node may generate an IGP Advertisement and "flood" (i.e., transmit) the packet over each of its network interfaces coupled to other IGP nodes. Thereafter, a second IGP node may receive the flooded IGP Advertisement and update its routing table based on routing information contained in the received IGP Advertisement. Next, the second IGP node may flood the received IGP Advertisement over each of its network interfaces, except for the interface at which the IGP Advertisement was received. This flooding process may be repeated until each interconnected IGP node has received the IGP Advertisement and updated its local routing table.

In practice, each IGP node typically generates and disseminates an IGP Advertisement whose routing information includes a list of the intermediate node's neighboring network nodes and one or more "cost" values associated with each neighbor. As used herein, a cost value associated with a neighboring node is an arbitrary metric used to determine the relative ease/burden of communicating with that node. For instance, the cost value may be measured in terms of the number of hops required to reach the neighboring node, the average time for a packet to reach the neighboring node, the amount of network traffic or available bandwidth over a communication link coupled to the neighboring node, etc.

As noted, IGP Advertisements are usually flooded until each intermediate network IGP node has received an IGP Advertisement from each of the other interconnected intermediate nodes. Then, each of the IGP nodes (e.g., in a link-state protocol) can construct the same "view" of the network topology by aggregating the received lists of neighboring nodes and cost values. To that end, each IGP node may input this received routing information to a "shortest path first" (SPF) calculation that determines the lowest-cost network paths that couple the intermediate node with each of the other network nodes. For example, the Dijkstra algorithm is a conventional technique for performing such a SPF calculation, as described in more detail in Section 12.2.4 of the text book *Interconnections Second Edition*, by Radia Perlman, published September 1999, which is hereby incorporated by reference as though fully set forth herein. Each IGP node updates the routing information stored in its local routing table based on the results of its SPF calculation. More specifically, the RIB updates the routing table to correlate destination nodes with next-hop interfaces associated with the lowest-cost paths to reach those nodes, as determined by the SPF calculation.

Multi-Protocol Label Switching (MPLS) Traffic Engineering has been developed to meet data networking requirements such as guaranteed available bandwidth or fast restoration. MPLS Traffic Engineering exploits modern label switching techniques to build end-to-end tunnels based on a series of constraints through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, "affinities" (administrative constraints to avoid or include certain links), etc. Path computation can either be performed by the head-end LSR or by some other entity operating as a path computation element (PCE) not co-located on the head-end LSR. The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE-LSPs can be configured within a single domain, e.g., area, level, or AS, or may also span multiple domains, e.g., areas, levels, or ASes.

The PCE is an entity having the capability to compute paths between any nodes of which the PCE is aware in an AS or area. PCEs are especially useful in that they are more cognizant of network traffic and path selection within their AS or area, and thus may be used for more optimal path computation. A head-end LSR may further operate as a path computation client (PCC) configured to send a path computation request to the PCE, and receive a response with the computed path, which potentially takes into consideration other path computation requests from other PCCs. It is important to note that when one PCE sends a request to another PCE, it acts as a PCC. A PCC can be informed of a PCE either by pre-configuration by an administrator, or by a PCE Discovery (PCED) message ("advertisement"), which is sent from the PCE within its area or level or across the entire AS to advertise its services.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205. In the case of traffic engineering applications, RSVP signaling is used to establish a TE-LSP and to convey various TE-LSP attributes to routers, such as border routers, along the TE-LSP obeying the set of required constraints whose path may have been computed by various means.

TE-LSP path computation algorithms, such as CSPF, have powerful properties in terms of flexibility, reactiveness, robustness, etc., and are very widely deployed in MPLS TE-enabled networks. However, there are often occasions where it may be difficult for the path computation algorithms to locate a path for the TE-LSP that satisfies the constraints of the TE-LSP, such as, e.g., bandwidth, cost, etc. For instance, a core or edge network element failure (e.g., in the absence of a forwarding adjacency) often removes a great portion of usable network topology (e.g., causing the rerouting of many TE-LSPs and possible traffic sloshing, as will be understood by those skilled in the art). Also, conventional traffic growth over time often creates increased demand and congestion over "popular" paths (e.g., shortest paths or primary paths). As a result of these and other conditions, existing TE-LSPs that reserve a certain amount of bandwidth may require resizing (either manual or dynamic) to reserve more bandwidth, i.e., to become larger TE-LSPs. Also, these conditions may require the creation of new TE-LSPs that require being sized to a certain amount of bandwidth. Often, however, the required bandwidth (or "size") of the TE-LSP prohibits the TE-LSP from utilizing the optimal (e.g., shortest) path across the computer network, e.g., as computed by the path computation algorithm. In this case, according to one sub-optimal approach, the best available path meeting the constraints may be selected and utilized, even where that best available path may be many magnitudes worse than (e.g., longer than or costlier than) the best unconstrained path. Notably, the TE-LSP may utilize a less optimal path even in the event that the excess bandwidth is only minimally greater than that available on the best unconstrained path.

Currently, if a path computation algorithm fails altogether to place a larger TE-LSP due to its constraints, a number of sub-optimal and impractical solutions exist. For example, the constraints may be relaxed such that an available path may exist that meets the relaxed constraints. As those skilled in the art will understand, the more the constraints are relaxed, the more available paths will exist (e.g., shorter and/or more optimal paths). However, this approach is sub-optimal, in that the originally required constraints are compromised simply for the ability to place at least a portion of the larger TE-LSP. Also, for existing TE-LSPs that are unable to be sized to a larger TE-LSP, the constraints of the existing TE-LSP may remain the same, thus not satisfying the required demand. Notably, if the configuration and/or management of the TE-LSPs are manual (e.g., by a system administrator), each of the above approaches may become poorly scalable and difficult to practice. In particular, a system administrator may manually create multiple smaller TE-LSPs (e.g., ambiguously) rather than a single larger TE-LSP, but again, this approach is poorly scalable, sub-optimal, cumbersome, and ultimately impractical.

SUMMARY OF THE INVENTION

The present invention is directed to a technique for dynamically splitting Traffic Engineering (TE) Label Switched Paths (LSPs) in a computer network. According to the novel technique, a head-end node may determine that a TE-LSP to a destination needs to be sized to a larger bandwidth (a "larger" TE-LSP) than currently available over a single path to the destination (e.g., a path that may also be required to meet other constraints, such as cost, delay, etc.). In response, the head-end node may dynamically "split" the larger TE-LSP, and create a first split TE-LSP over a best (e.g., shortest) available path (e.g., that meets other constraints). The first split TE-LSP may reserve a maximum available bandwidth for that best available path. The head-end node may then continue recursively creating subsequent split TE-LSPs for any remaining bandwidth of the larger TE-LSP over available paths until the larger TE-LSP may no longer be split (e.g., all bandwidth has been placed, configurable maximum number of splits reached, etc.). Notably, the split TE-LSPs may be "re-groomed" at a later time to recombine and reorganize the split TE-LSPs.

In accordance with one aspect of the present invention, the need to size a TE-LSP larger than the bandwidth currently available over a single path may arise during the initial creation of a new TE-LSP, or during a resizing of an existing TE-LSP. If a single selected path would exceed a maximum allowable utilization based on the larger TE-LSP bandwidth, then it may be necessary to split the larger TE-LSP. For instance, if no alternative paths exist that could support the larger TE-LSP except for those with an unacceptable metric increase (e.g., cost, delay, hop-count, etc.), then the larger TE-LSP may need to be split. If, however, a single path meets the constraints requirements (both bandwidth and other metrics), then there may be no need to split the TE-LSP. Notably, while a head-end node may wish to resize an existing TE-LSP, if the bandwidth increase is configurably small, the head-end node may decide that there is not a need to split the existing TE-LSP for the small increase.

In accordance with another aspect of the present invention, to split a TE-LSP, a head-end node locates the shortest (constrained) path to the TE-LSP destination, and determines the maximum amount (e.g., a physical maximum or configured maximum) of available bandwidth of that path. If the metric increase (e.g., cost, delay, etc.) for the path is configurably too large, the TE-LSP may not be split along that path. Notably, for metrics that change based on bandwidth (e.g., tiered cost structures), the maximum available bandwidth may be determined based on a maximum increase in metric (e.g., an amount of bandwidth before the cost transcends to the next tier). Also, if the maximum available bandwidth is configurably too small for the path (e.g., too small to merit a separate TE-LSP), the TE-LSP may not be split along that path. In the absence of either of these two situations, a split TE-LSP is created reserving the maximum available bandwidth over the path. Any remaining bandwidth for the original larger TE-LSP may then be recursively split (e.g., into "related" split TE-LSPs) by the head-end node until the larger TE-LSP may no longer be split (e.g., all bandwidth of the larger TE-LSP has been placed over available paths, a configurable maximum number of splits/attempts has been reached, etc.).

In accordance with yet another aspect of the present invention, the split TE-LSPs may be re-groomed after expiration of a configurable timer and/or in response to one or more re-grooming event triggers. To re-groom the split TE-LSPs, the total bandwidth of related split TE-LSPs is combined at the head-end node and re-subjected to the splitting process described above. Now, however, the splitting process is, in essence, attempting to enlarge the TE-LSPs, such as where bandwidth may have been freed on paths with better metrics. Unless the re-groomed TE-LSPs are configurably better than the current split TE-LPSs, no action is taken on the current split TE-LSPs.

Advantageously, the novel technique dynamically splits TE-LSPs in a computer network. By splitting larger TE-LSPs, the novel technique increases the ability to reserve larger amounts of bandwidth for traffic flows using smaller related TE-LSPs, e.g., without having to sacrifice performance that may generally be associated with placing larger TE-LSPs. For instance, by splitting TE-LSPs, shorter paths may become available for smaller related TE-LSPs than for a single larger TE-LSP, thus allowing more traffic to follow the shorter paths. Also, the novel technique allows for traffic originally meant to traverse larger TE-LSPs to be more optimally load balanced across the network through a plurality of smaller TE-LSPs. Further, the dynamic nature of the novel technique alleviates the need for cumbersome manual configuration.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
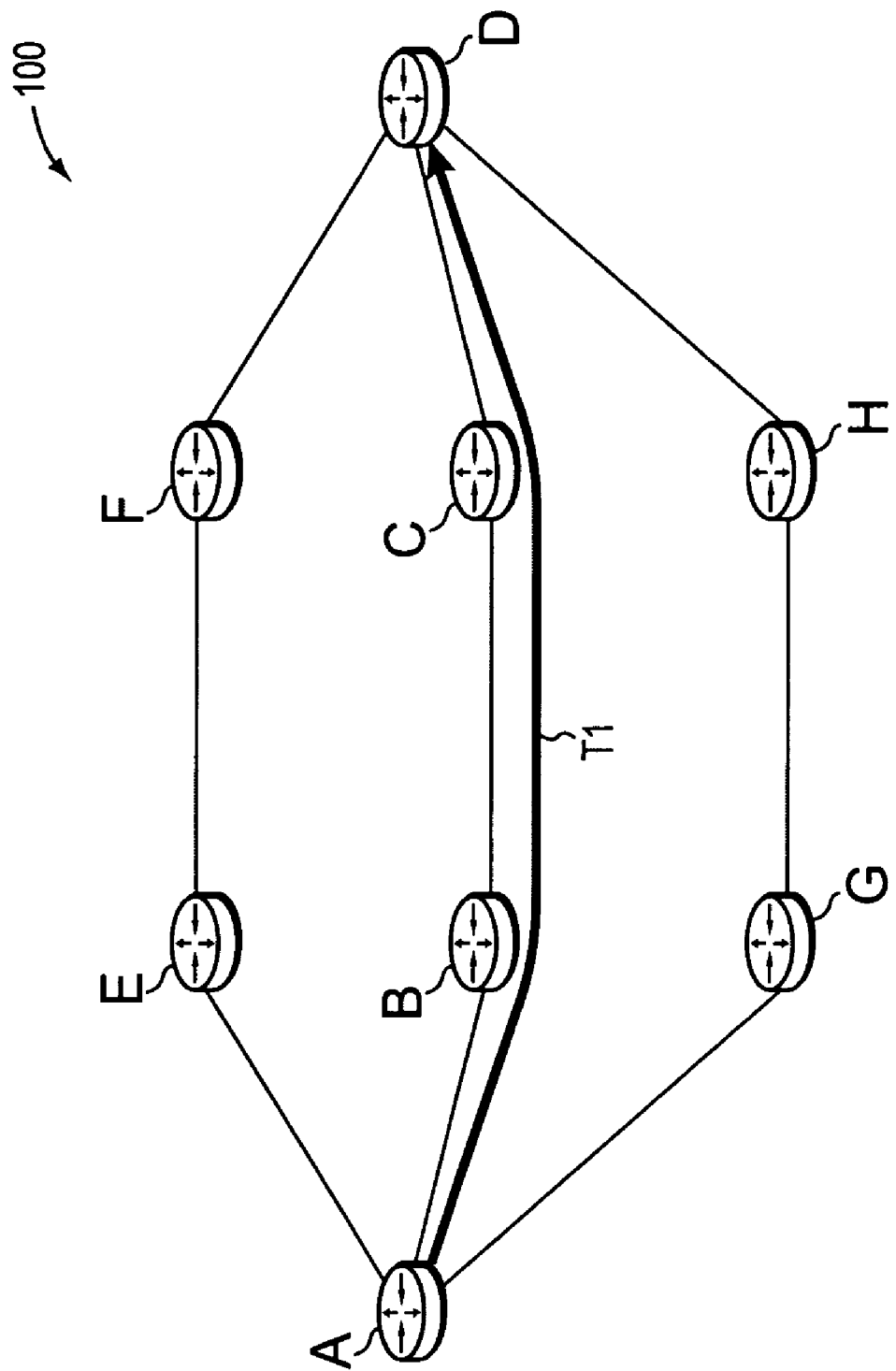
FIG. 1 is a schematic block diagram of an exemplary computer network that may be used in accordance with the present invention.

FIG. 1 is a schematic block diagram of an exemplary computer network 100 comprising routers A-H (e.g., intra-domain routers) interconnected through links as shown. The links between the routers may have an associated metric value (e.g., cost), and available bandwidth value, as described below. Network 100 may be contained within a single autonomous system (AS) or area, or may span multiple areas under certain circumstances as will be understood by those skilled in the art. An AS is herein defined to be a group of intermediate nodes, such as inter-domain and/or intradomain routers, within a network that are subject to a common authority and execute one or more inter-domain and/or intradomain routing protocols. Although the network 100 is illustratively shown within a single AS, those skilled in the art will appreciate that the network may alternatively be configured as routing domains or other networks or subnetworks. Notably, any number of nodes or routers may be used in the network 100, and that any number of links may be contained within the network 100 interconnected in various other configurations. These examples are merely representative, and the view shown herein is for simplicity.

Data packets may be exchanged among the nodes (routers) of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers of the computer network using predetermined Interior Gateway Protocols (IGPs), such as conventional distance-vector protocols or, illustratively, link-state protocols, through the use of IGP Advertisements.

Figure 2:
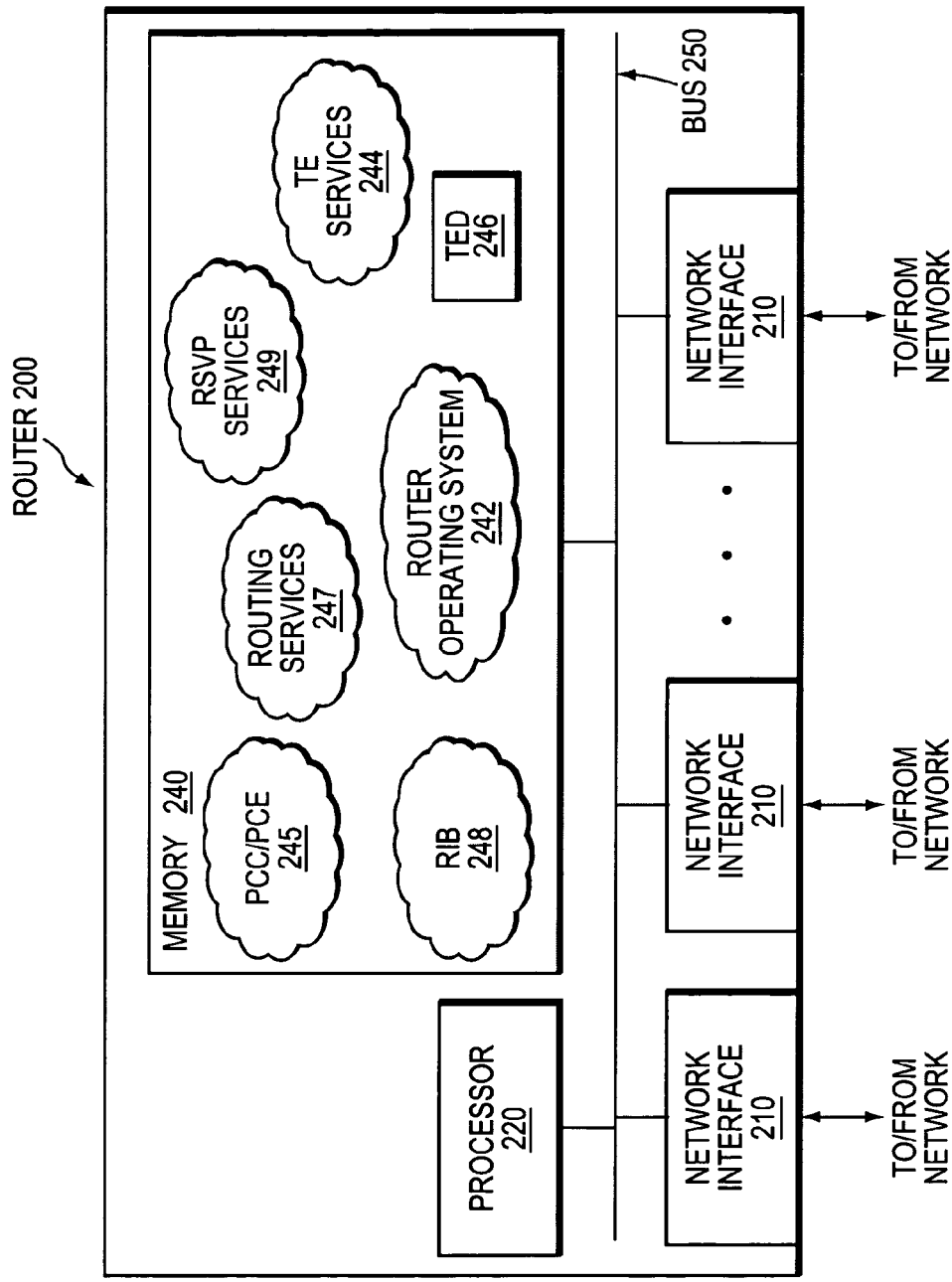
FIG. 2 is schematic block diagram of an exemplary router that may be advantageously used with the present invention.

FIG. 2 is a schematic block diagram of an exemplary router (or node) 200 that may be advantageously used with the present invention. The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as Traffic Engineering Database (TED) 246. A router operating system 242, portions of which is typically resident in memory 240 and executed by the processor, functionally organizes the router by, inter alia, invoking network operations in support of software processes and/or services executing on the router. These software processes and/or services may comprise routing services 247, PCC/PCE services 245, Traffic Engineering (TE) services 244, Routing Information Base (RIB) 248, and RSVP services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP, e.g. OSPF and IS-IS. These functions may be configured to manage a forwarding information database (not shown) containing, e.g., data used to make forwarding decisions. Also, RIB 248 may operate in conjunction with routing services 247 to maintain and manage routing tables (not shown) as will be understood by those skilled in the art. RSVP services 249 contain computer executable instructions for implementing RSVP and processing RSVP messages in accordance with the present invention. RSVP is described in RFC 2205, entitled *Resource ReSerVation Protocol (RSVP)*, and in RFC 3209, entitled *RSVP-TE: Extensions to RSVP for LSP Tunnels*, both as incorporated above.

TE services 244 contain computer executable instructions for operating TE functions in accordance with the present invention. Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. TED 246 is illustratively resident in memory 240 and used to store TE information provided by the routing protocols, such as RSVP and/or IGP (with TE extensions, e.g., as described herein), including, inter alia, TE topology of computer network 100, as will be understood by those skilled in the art. The TED 246 is illustratively maintained and managed by TE services 244.

Changes in the network topology may be communicated among routers 200 using a link-state protocol, such as the conventional OSPF and IS-IS protocols. Suppose, for example, that a communication link fails within an AS or a cost value associated with a network node changes. Once the change in the network's state is detected by one of the routers, that router may flood an IGP Advertisement communicating the change to the other routers in the AS. In this manner, each of the routers eventually "converges" to an identical view of the network topology.

Figure 3:
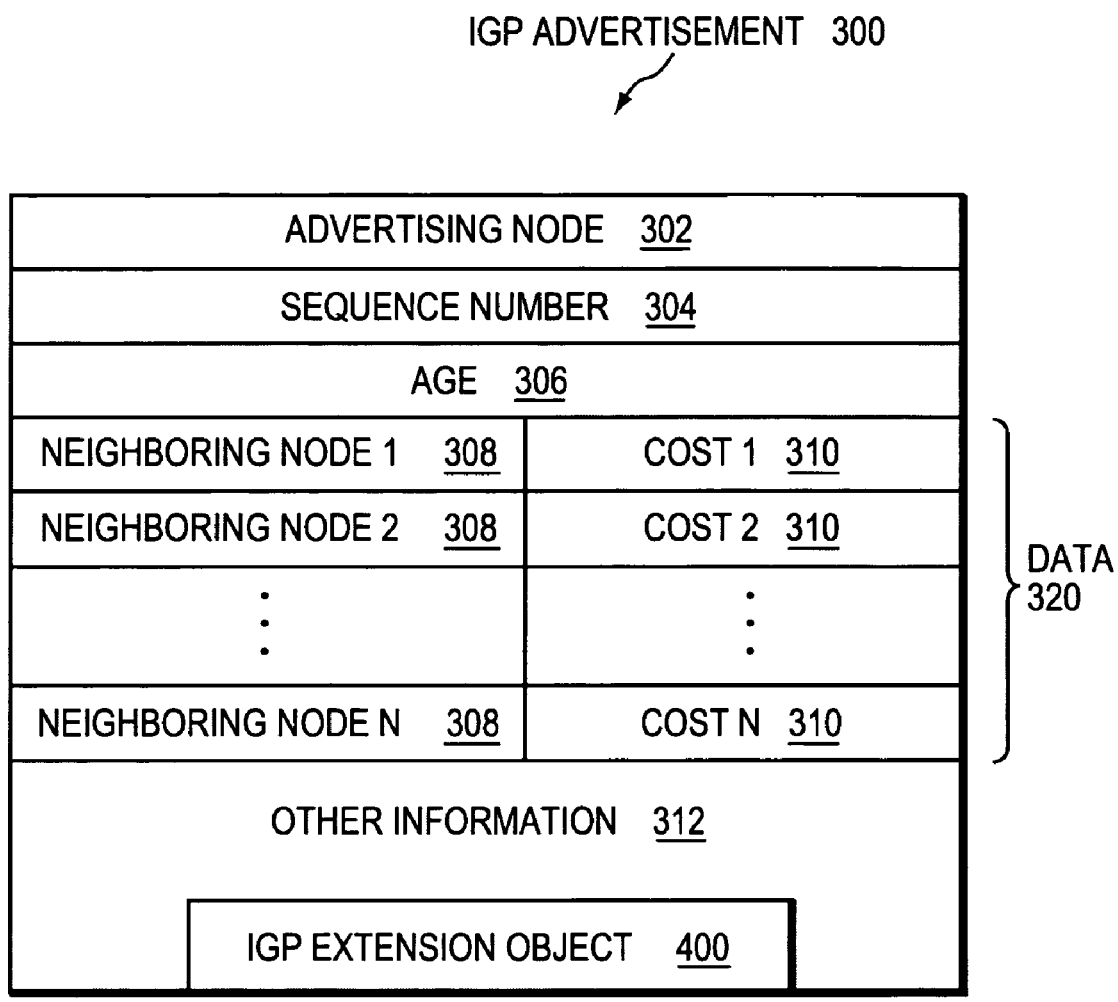
FIG. 3 is a schematic block diagram of an exemplary IGP Advertisement that may be flooded by the routers.

FIG. 3 illustrates an exemplary IGP Advertisement 300 that may be flooded by the routers 200. The packet includes an advertising-node field 302, a sequence-number field 304, an age field 306, a data section 320, and other routing information 312. The advertising-node field 302 stores a value that identifies the router that generated and originally broadcast the IGP Advertisement 300. The sequence-number field 304 stores a sequence number indicating the relative version of the IGP Advertisement. Typically, the sequence number stored in the field 304 is incremented, e.g., by one, for every new version of the IGP Advertisement. The IGP Advertisement 300 is therefore considered "stale" (invalid) if its sequence number is less than the sequence number stored in a previously-received version of the IGP Advertisement, i.e., generated by the same advertising node. Accordingly, the routers 200 may be configured to store and forward only the most recent version of an IGP Advertisement, e.g., the version having the largest sequence number.

The age field 306 also stores a value that may be used for determining whether the IGP Advertisement 300 is valid. The age value is typically initialized to a non-zero integer value, often in units of seconds. The age value may be decremented, e.g., by one every second, until the age value reaches zero, thereby indicating that the IGP Advertisement has become invalid. That is, every router 200 that stores or floods the IGP Advertisement 300 continuously ages the packet until the age value equals zero. Those skilled in the art will appreciate that other aging mechanisms alternatively may be used, such as incrementing the IGP Advertisement age value from an initial value, e.g., equal to zero, until the age value reaches a known upper limit.

The data section 320 includes one or more pairs of neighboring-node fields 308 and cost fields 310. Each neighboring-node field 308 stores a value, such as an address, indicating a network node that is directly accessible from the intermediate node identified in the advertising-node field 302. The field 310 stores a cost value that is associated, e.g., by the advertising node, with the network node identified in the neighboring-node field 308. As shown, each neighboring-node field 308 is associated with only one corresponding cost field 310. However, it is noted that in other embodiments, a single neighboring node may be associated with a plurality of cost values. Other routing information 312 may also be included in the IGP Advertisement 300, such as checksum values, packet-length information, flag values, type-of-service metrics, etc., and/or an IGP Extension Object 400, which may be used to convey user-specified information, as will be understood by those skilled in the art. Generally, the received IGP Advertisements are stored in a Link-State Database (LSDB) of the router 200 (not shown).

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop.

The paths taken by packets that traverse the network in this manner are referred to as label switched paths (LSPs) or Traffic Engineering (TE)-LSPs. Establishment of a TE-LSP requires computation of a path, signaling along the path, and modification of forwarding tables along the path. An example TE-LSP, T1, may be seen in FIG. 1 as the thick line and arrow between routers A-D. MPLS TE establishes LSPs that have guaranteed bandwidth under certain conditions. Illustratively, the TE-LSPs may be signaled through the use of the RSVP protocol (with Traffic Engineering extensions), and in particular, RSVP TE signaling messages. Notably, when incorporating the use of PCEs, the path computation request (and response) between PCC and PCE can be exchanged in accordance with a protocol specified in Vasseur, et al., *Path Computation Element (PCE) communication Protocol (PCEP)—Version* 1 <*draft-vasseur-pce-pcep*-0.2.*txt*>, Internet Draft, September 2005, which is hereby incorporated by reference as though fully set forth herein. It should be understood that the use of RSVP or PCEP serves only as an example, and that other communication protocols may be used in accordance with the present invention.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

The present invention is directed to a technique for dynamically splitting TE-LSPs in a computer network. According to the novel technique, a head-end node may determine that a TE-LSP to a destination needs to be sized to a larger bandwidth (a "larger" TE-LSP) than currently available over a single path to the destination (e.g., a path that may also be required to meet other constraints, such as cost, delay, etc.). In response, the head-end node may dynamically "split" the larger TE-LSP, and create a first split TE-LSP over a best (e.g., shortest) available path (e.g., that meets other constraints). The first split TE-LSP may reserve a maximum available bandwidth for that best available path. The head-end node may then continue recursively creating subsequent split TE-LSPs for any remaining bandwidth of the larger TE-LSP over available paths until the larger TE-LSP may no longer be split (e.g., all bandwidth has been placed, configurable maximum number of splits reached, etc.). Notably, the split TE-LSPs may be "re-groomed" at a later time to recombine and reorganize the split TE-LSPs.

In the illustrative embodiment described herein, a notification of average link load utilization may be transmitted from nodes of the computer network to the head-end node using IGP messages 300. Each node may create an IGP message 300 that is used to propagate ("advertise") the notification to other nodes (e.g., head-end nodes) in its domain, e.g., its IGP area/level. The IGP message 300 may be embodied as an OSPF or IS-IS advertisement message ("IGP message" or "IGP advertisement"). Notably, the IGP Advertisement may include a type/length/value (TLV) encoded format used to convey the link utilization notification.

Figure 4:
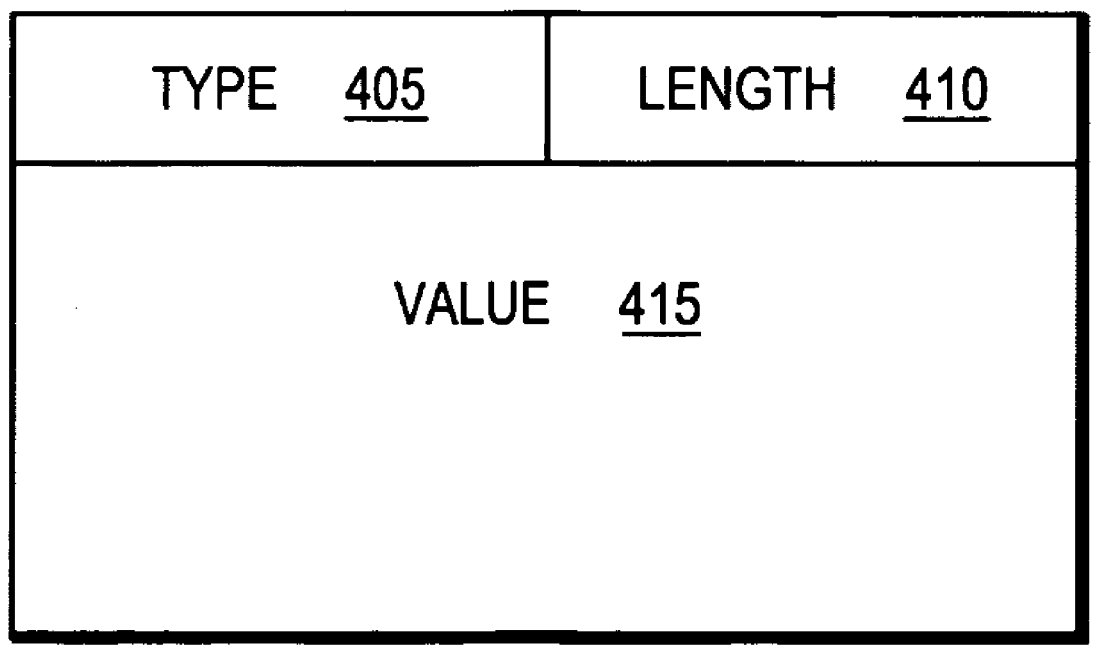
FIG. 4 is a schematic block diagram illustrating the format of an IGP Extension Object that may be advantageously used with the present invention.

FIG. 4 is a schematic block diagram illustrating an IGP Extension Object 400 illustratively encoded using a TLV format that may be advantageously used with the present invention. The TLV encoding format is a general way to communicate information between nodes, such as routers. The TLV "attribute" 400 is used to identify a type (T) of information being communicated (conveyed), a length (L) of information to be conveyed and a value (V) of the actual information conveyed. The length (L) parameter contained in the length field 410 is typically implementation-specific and can denote the length from the beginning of the Type field 405 of the attribute 400 to the end. However, the length generally denotes the length of the Value (V) field 415 and not the Type (T) or Length (L) fields. Specifically, in accordance with the present invention, Value field 415 encodes the average link load utilization for specified links of the IGP message 300. Notably, the TLV format described herein is merely an example, and those skilled in the art will understand that other object formats for the IGP Extension object 400 may be used in accordance with the present invention.

Conventionally, TE topology stored within TED 246 of a node contains, inter alia, link sizes (total bandwidth) and the amount of bandwidth reserved on those links by TE-LSPs for which the TED maintains a state. However, TED 246 does not generally store the actual amount of bandwidth currently utilized on the links, or bandwidth reserved by TE-LSPs without a state in the TED (e.g., that do not traverse the node). Average link load utilization contained within the IGP extension object 400 may be computed by each originating node (attached to the link), e.g., using a low pass filter and configurable weight, as will be understood by those skilled in the art. The IGP extension object 400 may then be transmitted to other nodes of the network for storage in respective TEDs 246, e.g., such as for an initial IGP advertisement 300 for the link, or in the event of a configurable change in the average link load utilization in order to improve scalability. Notably, the use of IGP messages 300 and IGP extension objects 400 to convey the average link load utilization are merely representative, and other means known to those skilled in the art for determining the average link load utilization of links in the computer network 100 may be used in accordance with the present invention accordingly.

In accordance with one aspect of the present invention, the need to size a TE-LSP larger than the bandwidth currently available over a single path may arise during the initial creation of a new TE-LSP, or during a resizing of an existing TE-LSP, e.g., both either manual or dynamic. For example, a system administrator or dynamic software process may determine that a new TE-LSP needs to be created from a head-end node (e.g., router A) to a destination or tail-end node (e.g., router D). Alternatively, the system administrator or dynamic software process may determine that an existing TE-LSP (e.g., T1) needs to be resized to a larger bandwidth to accommodate increased traffic, as will be understood by those skilled in the art. In each of the above situations, the requested bandwidth of the TE-LSP may be larger than available over a single path from the head-end node to the tail-end node. If a single selected path (e.g., the current path of existing TE-LSPs) would exceed a maximum allowable utilization based on the larger TE-LSP bandwidth, then it may be necessary to split the larger TE-LSP.

Various circumstances may exist that define the maximum allowable utilization along a path. For instance, most basically, one or more links along the path may not have a total capacity that could support the larger TE-LSP. For example, a 100 megabyte per second (MBps) link can not support a 200 MBps TE-LSP. Also, a 100 MBps, upon which 60 MBps is already reserved, can not support an additional 50 MBps TE-LSP. Other reasons defining a maximum allowable utilization may comprise: i) configured link thresholds, e.g., no more than a configured percentage of total link utilization (e.g., a maximum link utilization, or MLU value), such as 80%; ii) TE-LSP thresholds, e.g., no TE-LSPs greater than a certain size, such as 100 MBps; iii) head-end inspired thresholds, e.g., no more than a certain amount of traffic over a particular link, such as 30 MBps between routers A and B; etc. Still other reasons defining a maximum allowable utilization for a path that may not support a larger TE-LSP will be understood by those skilled in the art, and the reasons mentioned herein are merely representative examples. For instance, where a low priority TE-LSP is preempted by a higher priority TE-LSP as utilization on the path increases, the low priority TE-LSP may need to be split to accommodate the higher priority TE-LSPs.

Notably, an acceptable path must also be acceptable in terms of constraints other than bandwidth. For instance, if no alternative paths exist that could support the larger TE-LSP except for those with an unacceptable metric increase (e.g., cost, delay, hop-count, etc.), then the larger TE-LSP may need to be split. The metric increase may be configured as an absolute threshold (e.g., cost increase greater than 10, hop-count increase greater than 5, etc.), or a relative threshold (e.g., 10% increase in cost, 20% increase in delay, etc.). In addition, for creation of new TE-LSPs, a maximum threshold metric value may also be defined, e.g., no greater than a cost of 100 for any TE-LSP. Moreover, the "maximum allowable utilization" as used herein may be used to describe the maximum allowable/available bandwidth based on the configured metric increase thresholds. For example, a path may have 200 MBps of available bandwidth, however the cost to use that path may exceed an acceptable cost. On the other hand, if utilizing only 100 MBps of the 200 MBps creates an acceptable cost, then 100 MBps is the maximum allowable utilization of the path. Accordingly, if the size of the larger TE-LSP is greater than 100 MBps, then the larger TE-LSP can not be placed acceptably over this path.

Further, while a head-end node may wish to resize an existing TE-LSP, if the bandwidth increase is configurably small, the head-end node may decide that there is not a need to split the existing TE-LSP for the small increase. For instance, a system administrator may configure the head-end node to prevent the creation of split TE-LSPs where the requested increase in bandwidth is less than 5% of the current bandwidth. As an example, assume that a TE-LSP, e.g., T1, has currently reserved 100 MBps of bandwidth, and the head-end node, e.g., router A, wishes to increase T1 to 103 MBps of bandwidth. According to the configuration, a 3% increase does not merit creating split TE-LSPs. Instead, the head-end node may decide not to increase the bandwidth, and may return an error. Those skilled in the art will understand that static values may also be defined, such as, e.g., no less than a 5 MBps of bandwidth increase to create split TE-LSPs, etc.

If, however, a single path (e.g., the current path of existing TE-LSPs) meets the constraints requirements (both bandwidth and other metrics), then there may be no need to split the TE-LSP. In this case, the TE-LSP may be routed conventionally over the best available path, as will be understood by those skilled in the art.

In accordance with another aspect of the present invention, to split a TE-LSP, a head-end node (e.g., router A) locates the shortest (constrained) path to the TE-LSP destination, and determines the maximum amount (e.g., a physical maximum or configured maximum) of available bandwidth of that path. The maximum available bandwidth (e.g., an MLU value) may be discovered by the IGP messages 300 (e.g., IGP extension object 400), or computed by the head-end node based on received TE messages and/or maintained states of TE-LSPs, as will be understood by those skilled in the art. Note that in the event an existing TE-LSP already exists that needs to be resized to a larger TE-LSP, the maximum amount of available bandwidth is at least the amount of bandwidth currently reserved by the existing TE-LSP, in addition to any extra available bandwidth over the same path.

If the metric increase (e.g., cost, delay, etc.) for the path is configurably too large, the TE-LSP may not be split along that path, as described above. For example, if a split TE-LSP path is greater than 20% of the cost of an original existing TE-LSP, the head-end node may be configured to reject that path for a split TE-LSP. Notably, for metrics that change based on bandwidth utilization (e.g., tiered cost structures), the maximum available bandwidth may be determined based on a maximum increase in metric (e.g., an amount of bandwidth before the cost transcends to the next tier), such as described above. Here, for example, if the maximum cost increase allowed is 30, and a first tier from 0 to 10 MBps costs 10, a second tier from 10.1 to 20 MBps costs 25, and a third tier from 20.1 to 30 MBps costs 40, the maximum allowable bandwidth for that path is 20 MBps (i.e., because utilizing bandwidth greater than 20 MBps costs 40, which is greater than the threshold).

Also, if the maximum available bandwidth is configurably too small for the path (e.g., too small to merit a separate TE-LSP), the TE-LSP may not be split along that path. For example, if the larger TE-LSP requires 100 MBps of bandwidth, and the maximum available bandwidth over a particular path is 1 MBps, the head-end node may be configured to reject the current path for a split TE-LSP. In the absence of either of these two situations (rejected based on metric increase or minimal available bandwidth), a split TE-LSP is created reserving the maximum available bandwidth over the path.

Any remaining bandwidth for the original larger TE-LSP may then be recursively split (e.g., into "related" split TE-LSPs) by the head-end node until the larger TE-LSP may no longer be split. To recursively split the larger TE-LSP into related split TE-LSPs, the head-end node continues to locate the next best path for the remaining bandwidth, places the maximum allowable bandwidth on that path, and continues to the next best path, and so on accordingly. The larger TE-LSP may no longer be split when, e.g., all bandwidth of the larger TE-LSP has been placed over available paths (i.e., no more bandwidth needs to be placed), a configurable maximum number of splits/TE-LSPs has been created (e.g., 15 TE-LSPs), a configurable maximum number of attempts has been reached (e.g., 20 attempts), no more available paths exist, etc.

Once the TE-LSP may no longer be split where bandwidth does remain, any remaining bandwidth of the larger TE-LSP may be managed in a number of ways. For instance, the remaining bandwidth may simply be discarded, and perhaps an error message may be returned via the head-end node. Alternatively, remaining bandwidth may be placed with the final related split TE-LSP regardless of the metric increase, or placed with other related split TE-LSP, such as along the most optimal path if available bandwidth remains, but at a higher cost increase. Other manners in which the remaining bandwidth may be managed will be understood by those skilled in the art.

Notably, those skilled in the art will appreciate that in accordance with the present invention, it may be desirable to route certain traffic, such as higher priority traffic (e.g., Voice over IP, VoIP) over the first related split TE-LSP because it may be the most optimal (shortest) TE-LSP path of the related TE-LSPs. To that end, managing which traffic to route over a particular TE-LSP may be advantageously optimized based on the obtained constraints of each related TE-LSP, e.g., high-priority traffic (voice) may traverse shorter paths, while low priority traffic (data) may traverse longer paths.

Figure 5:
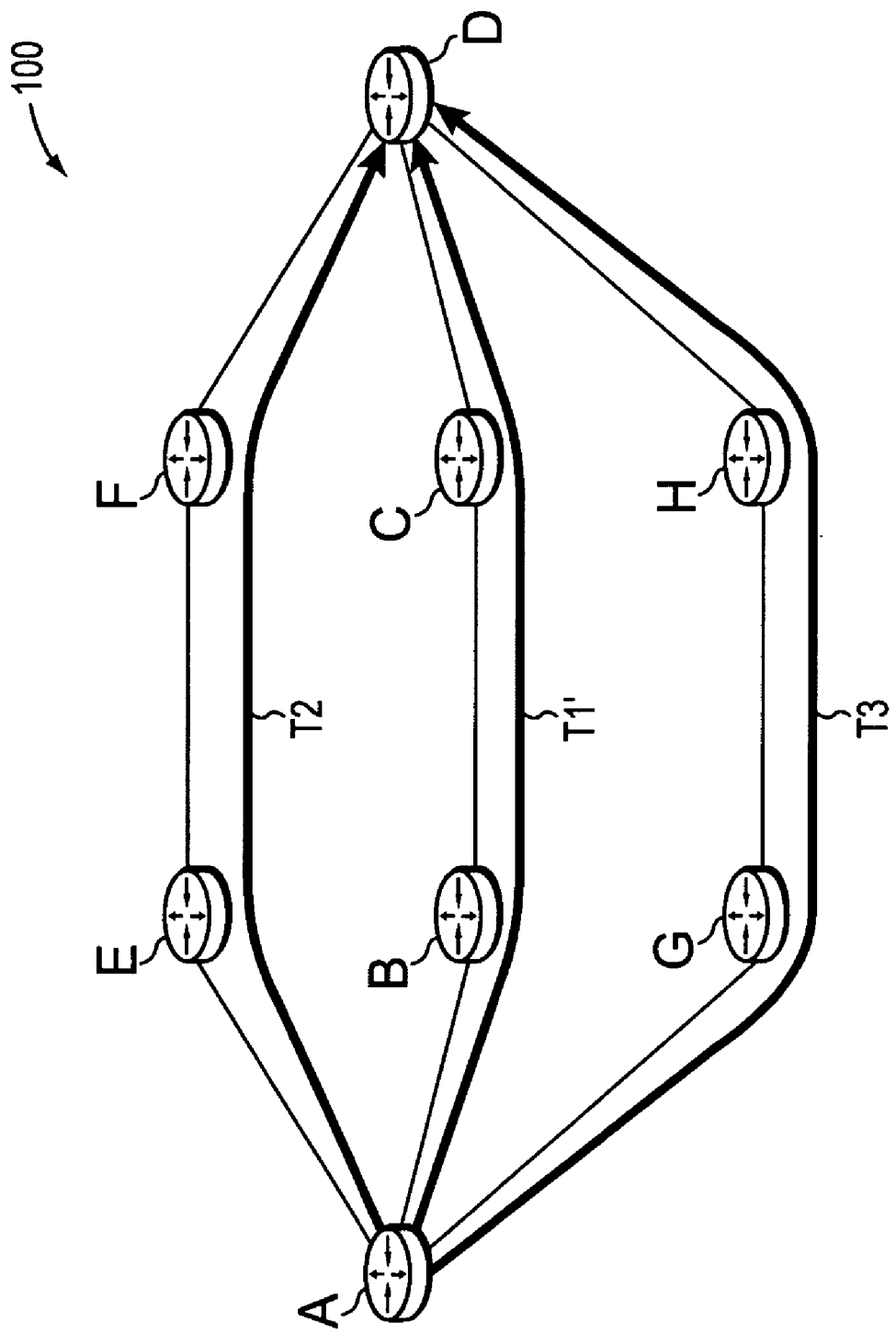
FIG. 5 is a schematic block diagram of the exemplary computer network of FIG. 1 with split TE-LSPs in accordance with the present invention.

Briefly, FIG. 5 is a schematic block diagram of the exemplary computer network of FIG. 1 with split TE-LSPs in accordance with the present invention. Illustratively, assume that T1, e.g., currently over the most optimal path from router A to router D as shown in FIG. 1, requires resizing to become a larger TE-LSP. In accordance with the present invention, it may be determined that a portion of the larger TE-LSP may be added to the existing T1, and a first split TE-LSP T1' may be created accordingly. The head-end node (router A) may then determine that another portion of the larger TE-LSP may be placed along the next best path from A-E-F-D, hence a second related split TE-LSP T2 may be created reserving the maximum available bandwidth along A-E-F-D in accordance with the present invention. Lastly, assume that the head-end node determines that a third best path, A-G-H-D, can support the remaining bandwidth from the larger TE-LSP, hence a third related TE-LSP T3 may be created reserving the remaining bandwidth. Further, assume that none of the related split TE-LSPs surpass metric increase thresholds and are each greater than a minimum amount of bandwidth, such as described above. Techniques known to those skilled in the art may now be applied to the related split TE-LSPs to route traffic accordingly from the head-end node to the destination (the tail-end node).

Optionally, an additional constraint may be placed on the split TE-LSPs that each of the split TE-LSPs must be diverse from other related split TE-LSPs. In other words, no two related split TE-LSPs may share any links (link diversity) or node (node diversity), depending upon the diversity configuration. For instance, if a link existed between nodes B and G in FIG. 5 (not shown), split TE-LSPs may generally utilize the link B-G if that link provides an optimal path for available bandwidth. However, in the event the optional link diversity constraint is placed on the split TE-LSPs, once T1' is created utilizing links A-B-C-D, no other related split TE-LSP may utilize links A-B-C-D, thus removing link B-G from useful consideration, as will be understood by those skilled in the art.

Figure 6:
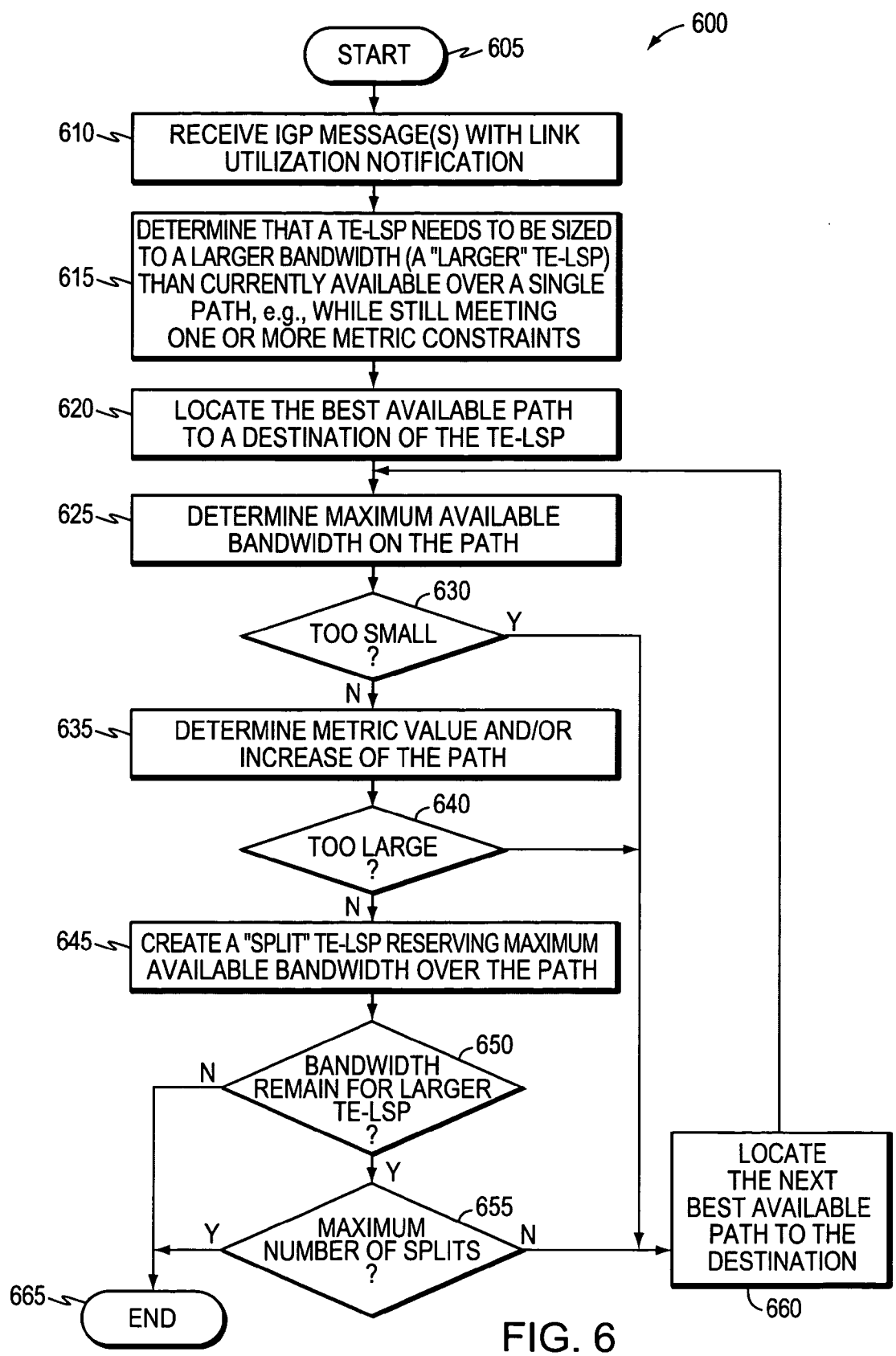
FIG. 6 is a flowchart illustrating a procedure for dynamically splitting TE-LSPs in a computer network in accordance with the present invention.

FIG. 6 is a flowchart illustrating a procedure for dynamically splitting TE-LSPs in a computer network in accordance with the present invention. The procedure 600 starts at step 605, and continues to step 610, where a head-end node receives one or more IGP messages 300 with link utilization notification, as described above. At step 615, the head-end node determines that a TE-LSP needs to be sized to a larger bandwidth than currently available over a single path. Notably, this may also imply, e.g., that a single path does not exist with the available bandwidth in addition to meeting one or more metric constraints (e.g., cost, delay, etc.), as described above. Accordingly, the head-end node determines that splitting the larger TE-LSP may be necessary. To split the TE-LSP, the head-end node locates the best available path to the destination of the TE-LSP in step 620, and also determines the maximum available bandwidth of the path in step 625. If the maximum available bandwidth is configurably too small in step 630 to merit a separate split TE-LSP, the procedure continues to step 660 where the head-end node locates the next best available path to the destination and the procedure returns to step 625. Otherwise, if the maximum available bandwidth is acceptable (i.e., not too small) in step 630, the head-end node determines the metric value and/or increase of the path, as compared to a current path (i.e., for a current TE-LSP), or as compared to configured thresholds for new paths in step 635. If the metric value/increase is too large in step 640, the next best available path may be located at step 660 and the procedure repeats (as described above). Notably, as also described above, the maximum available bandwidth may be based on a particular metric increase, such as, e.g., the maximum available bandwidth prior to transcending to a next cost tier with too large of a cost increase.

If it is determined that the metric value/increase is not too large in step 640, a split TE-LSP may be created in step 645, reserving the maximum available bandwidth of the currently selected path (or the remaining bandwidth required for the TE-LSP). If all of the required bandwidth of the larger TE-LSP has been placed, no bandwidth remains in step 650, and the procedure ends at step 665. If, on the other hand, the larger TE-LSP still requires more bandwidth at step 650, the head-end node determines whether a maximum number of splits/TE-LSPs has been reached in step 655, as described above. If so, the procedure ends at step 665, e.g., in accordance with the techniques described above with reference to any remaining bandwidth. Conversely, if the maximum number of splits/TE-LSPs has not been reached in step 655, the procedure continues to step 660 to locate the next best available path to the destination, and returns to step 625 to place the remaining bandwidth by repeating the subsequent steps as described above.

In accordance with yet another aspect of the present invention, the split TE-LSPs may be re-groomed after expiration of a configurable timer and/or in response to one or more re-grooming event triggers. The configurable timer may be used to allow for any network changes over time to occur that would result in freed up resources (e.g., bandwidth) or for other changes to occur (e.g., new paths). The re-grooming event triggers, on the other hand, may be based on, e.g., an increase in the amount of available bandwidth on one or more paths, an added network element (e.g., link or node), etc. The re-grooming process effectively attempts to minimize the number of TE-LSPs originating at the head-end node, and thus throughout the network, by recombining the split TE-LSPs.

Figure 7:
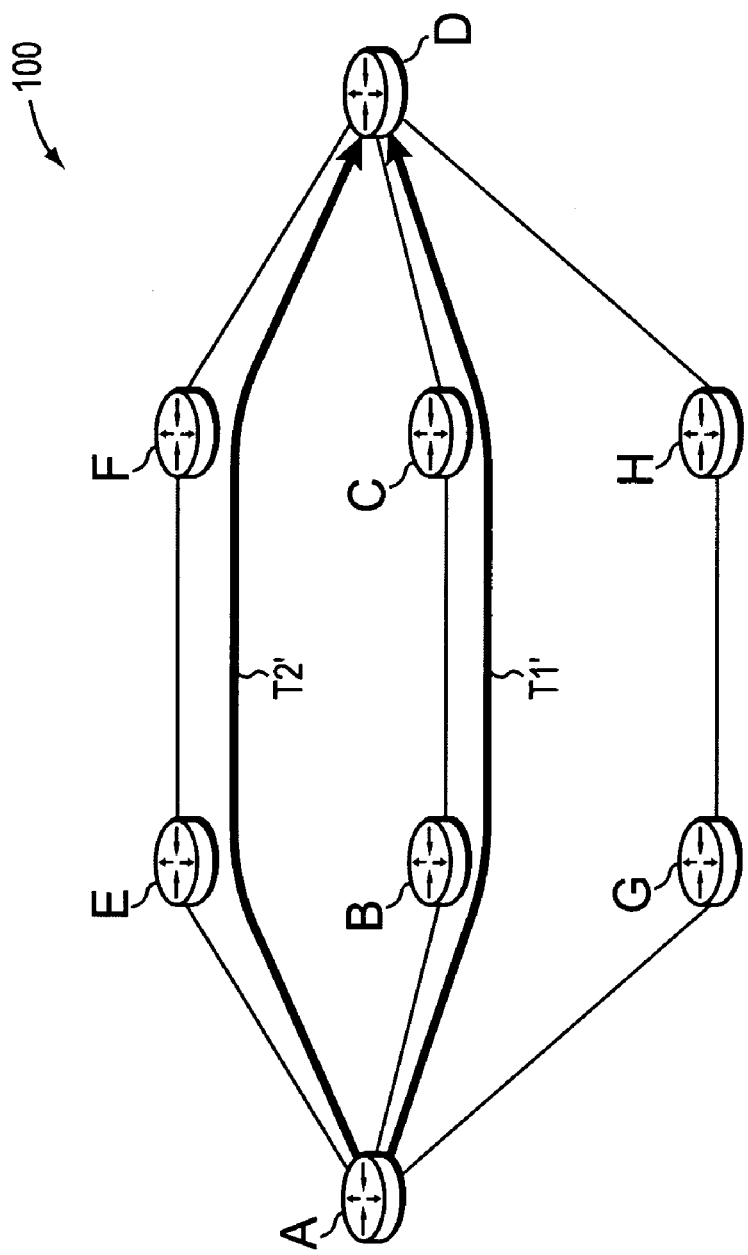
FIG. 7 is a schematic block diagram of the exemplary computer network of FIG. 5 with re-groomed TE-LSPs in accordance with the present invention.

To re-groom the split TE-LSPs, the total bandwidth of related split TE-LSPs is combined at the head-end and re-subjected to the splitting process described above. Now, however, the splitting process is, in essence, attempting to enlarge the TE-LSPs, such as where bandwidth may have been freed on paths with better metrics. Unless the re-groomed TE-LSPs are configurably better than the current split TE-LPSs, no action is taken on the current split TE-LSPs. For instance, refer to the example above with reference to FIG. 5, where related split TE-LSPs T1', T2, and T3 were created in accordance with the present invention. Further assume that, over time, bandwidth has been freed along path A-E-F-D in an amount greater than or equal to the bandwidth of T3. With reference now to FIG. 7, in response to the expiration of the timer or an event based trigger, the re-grooming process would attempt to recombine the related split TE-LSPs. The first split TE-LSP may remain as T1', which may maintain its current path and utilization. However, the head-end node may now determine that T2 may be increased to include the bandwidth of T3, hence moving the traffic of T3 over a more optimal path. T2' may then be created, i.e., as a combination of the original T2 and T3. Alternatively, the re-grooming process may act in reverse, such as first attempting to place bandwidth from T3 over a more optimal path, then T2, etc., as will be understood by those skilled in the art.

Notably, a single TE-LSP may result from such re-grooming in the event a single path has become available that meets the constraints (bandwidth, cost, etc.) of the combined split TE-LSPs (i.e., the originally attempted constraints). Moreover, the same number of related split TE-LSPs may exist after re-grooming, but a shift in bandwidth reservation may have taken place. For instance, in the example above, T1' may have increased in size, along with T2', but T3 may still remain with less reserved bandwidth. In addition to reducing the number of TE-LSPs, therefore, the re-grooming process also advantageously moves as much bandwidth from existing related split TE-LSPs as possible to more optimal paths. Those skilled in the art will also appreciate that if the network has new resources (e.g., new and more optimal paths), more split TE-LSPs may be created over those more optimal paths, provided that the maximum number of TE-LSPs has not been reached as described above.

Figure 8:
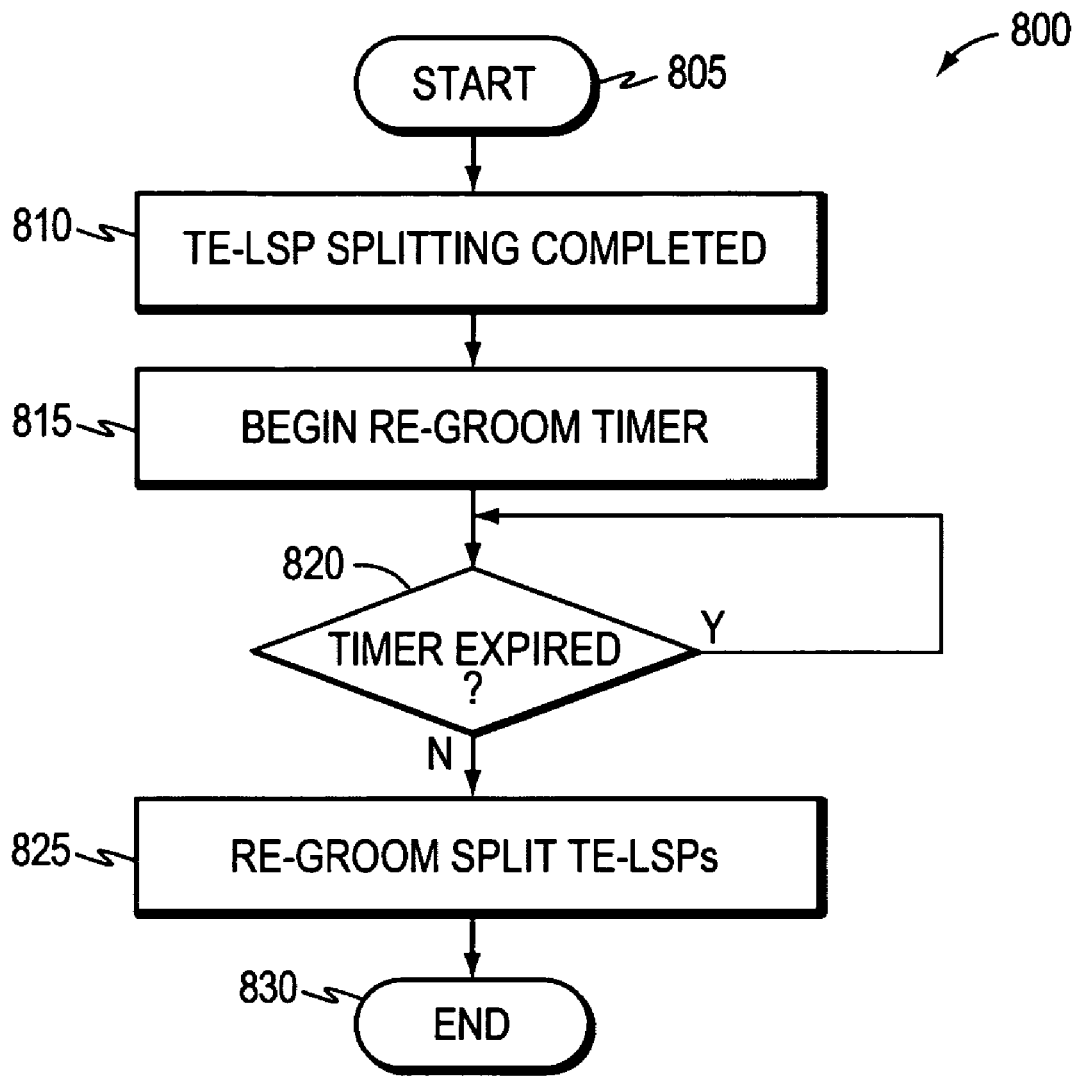
FIG. 8 is a flowchart illustrating a procedure for re-grooming split TE-LSPs in a computer network in accordance with the present invention.

FIG. 8 is a flowchart illustrating a procedure for re-grooming split TE-LSPs in a computer network in accordance with the present invention. The procedure 800 starts at step 805, and continues to step 810, where TE-LSP splitting is completed, e.g., the completion of procedure 600 of FIG. 6 above. Upon completion, a configurable length re-groom timer is begun in step 815, such as to allow for network changes. Once the re-groom timer expires in step 820, the split TE-LSPs may be re-groomed in step 825, as described above. Notably, in addition to the timer, step 825 may also be triggered in response to one or more network events, also as described above. When re-grooming is completed, the procedure ends in step 830.

A dynamic priority scheme may be used to assist in replacing existing TE-LSPs during the re-grooming process. An example of a dynamic priority scheme is described in more detail in commonly-owned copending U.S. patent application Ser. No. 11/121,685, entitled DYNAMIC TE-LSP PRIORITY AND PREEMPTION, filed by Vasseur on May 4, 2005, the contents of which are hereby incorporated in its entirety. A dynamic priority scheme increases the ability to place TE-LSPs that would be otherwise blocked by bandwidth fragmentation (e.g., related split TE-LSPs). Specifically, when requesting a re-groomed TE-LSP, the head-end node attempts to establish the re-groomed TE-LSP by dynamically increasing a priority value of the re-groomed TE-LSP within a corresponding range of priority values until adequate resources are available, at which time the head-end node may establish the re-groomed TE-LSP. Upon expiration of a configurable timer, the head-end node dynamically decreases the priority value of the re-groomed TE-LSP within the corresponding range of priority values and determines whether the re-groomed TE-LSP can lower its priority yet still obtain adequate resources along a path with an acceptable cost. If so, the head-end node may reestablish the re-groomed TE-LSP at the lower priority value.

Notably, the above techniques described herein may be used in accordance with the present invention for a response to a network element failure. For example, if an existing TE-LSP (e.g., T1) traverses a node that fails, the maximum available bandwidth along that path drops to zero, and T1 is currently requesting a larger TE-LSP than currently available over its path. The TE-LSP may then be split among other available paths, which may, as will be appreciated by those skilled in the art, result in a single TE-LSP, hence acting as a responsive redirection feature accordingly.

Advantageously, the novel technique dynamically splits TE-LSPs in a computer network. By splitting larger TE-LSPs, the novel technique increases the ability to reserve larger amounts of bandwidth for traffic flows using smaller related TE-LSPs, e.g., without having to sacrifice performance that may generally be associated with placing larger TE-LSPs. For instance, by splitting TE-LSPs, shorter paths may become available for smaller related TE-LSPs than for a single larger TE-LSP, thus allowing more traffic to follow the shorter paths. Also, the novel technique allows for traffic originally meant to traverse larger TE-LSPs to be more optimally load balanced across the network through a plurality of smaller TE-LSPs. Further, the dynamic nature of the novel technique alleviates the need for cumbersome manual configuration.

While there has been shown and described an illustrative embodiment that dynamically splits TE-LSPs in a computer network, it is to be understood that various other adaptations and modifications may be made within the spirit and scope of the present invention. For example, the invention has been shown and described herein for splitting TE-LSPs by the head-end node of the TE-LSP. However, the invention in its broader sense is not so limited, and may, in fact, be used with Path Computation Elements (PCEs) as will be understood by those skilled in the art. Also, while the invention has been shown and described for splitting MPLS TE-LSPs, the invention may, in fact, be used to split other types of tunnels, such as, e.g., Layer 2 Tunneling Protocol (L2TP) tunnels, IP tunnels, etc., as will be understood by those skilled in the art.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for dynamically splitting Traffic Engineering (TE) Label Switched Paths (LSPs) in a computer network, the method comprising:
    determining that a TE-LSP to a destination needs to be sized to a larger bandwidth (a larger TE-LSP) than available bandwidth over a single path to the destination; and
    in response to the determining,
        dynamically creating a first related split TE-LSP over a best available path, the first split TE-LSP reserving a maximum available band-width for the best available path, and
        recursively creating subsequent related split TE-LSPs for any remaining bandwidth of the larger TE-LSP over next best available paths until the larger TE-LSP can no longer be split.

2. The method as in claim 1, wherein the larger TE-LSP can no longer be split when at least one event occurs from a group comprising: reserving all remaining bandwidth of the TE-LSP, creating a maximum number of related split TE-LSPs, attempting a maximum number of available paths, and attempting all available paths.

3. The method as in claim 1, further comprising:
    determining the best and next best available paths that satisfy one or more metric constraints.

4. The method as in claim 3, wherein the metric constraints are selected from a group comprising: an absolute maximum cost, an absolute maximum cost increase, a relative maximum cost increase, an absolute maximum delay, an absolute maximum delay increase, a relative maximum delay increase, an absolute maximum hop-count, an absolute maximum hop-count increase, and a relative maximum hop-count increase.

5. The method as in claim 1, wherein the larger bandwidth is greater that the available bandwidth by a configurable amount.

6. A method comprising:
    determining, by a node in a computer network, that a Traffic Engineering (TE) Label Switched Path (LSP) to a destination needs to be sized to a larger bandwidth than available bandwidth over a single path to the destination;
    in response, dynamically creating a first related split TE-LSP over a best available path, the first split TE-LSP reserving a maximum available bandwidth for the best available path; and
    recursively creating subsequent related split TE-LSPs for any remaining band-width of the TE-LSP to the destination over next best available paths until the TE-LSP to the destination can no longer be split,
    wherein the best and next best available paths are paths having greater than a configurable amount of a minimum bandwidth.

7. The method as in claim 1, further comprising:
    receiving advertised average link load utilization notifications to discover the maximum available bandwidth of paths within the computer network.

8. The method as in claim 7, wherein the notifications are contained within Interior Gateway Protocol (IGP) messages.

9. The method as in claim 1, wherein each of the first and subsequent related split TE-LSPs traverses a diverse path.

10. The method as in claim 1, further comprising:
    re-grooming the related split TE-LSPs in response to a re-grooming trigger.

11. The method as in claim 10, wherein the re-grooming trigger is selected from a group comprising: expiration of a configurable timer, a configurable increase in bandwidth along a path in the computer network, an added network element to the computer network, and a manual trigger.

12. The method as in claim 10, further comprising:
    re-grooming the related split TE-LSPs only in the event a configurable gain over the related split TE-LSPs is achieved.

13. The method as in claim 10, further comprising:
    applying a dynamic priority scheme during the re-grooming of the related split TE-LSPs.

14. The method as in claim 1, wherein one or more related split TE-LSPs are more optimal than one or more less optimal related split TE-LSPs, the method further comprising:
    routing higher priority traffic over the more optimal related split TE-LSPs; and
    routing lower priority traffic over the less optimal related split TE-LSPs.

15. An apparatus for dynamically splitting Traffic Engineering (TE) Label Switched Paths (LSPs) in a computer network, the apparatus comprising:
    means for determining that a TE-LSP to a destination needs to be sized to a larger bandwidth (a larger TE-LSP) than available bandwidth over a single path to the destination; and
    means for dynamically creating a first split TE-LSP over a best available path, the first split TE-LSP reserving a maximum available bandwidth for the best available path and recursively creating subsequent related split TE-LSPs for any remaining bandwidth of the larger TE-LSP over available paths until the larger TE-LSP can no longer be split, in response to a determination from the means for determining.

16. A non-transitory computer readable storage medium containing executable program instructions for dynamically splitting Traffic Engineering (TE) Label Switched Paths (LSPs) in a computer network, the executable program instructions comprising program instructions for:
    determining that a TE-LSP to a destination needs to be sized to a larger bandwidth (a larger TE-LSP) than available bandwidth over a single path to the destination; and
    in response to the determining,
        dynamically creating a first split TE-LSP over a best available path, the first split TE-LSP reserving a maximum available bandwidth for the best available path, and recursively creating subsequent related split TE-LSPs for any remaining bandwidth of the larger TE-LSP over available paths until the larger TE-LSP can no longer be split.

17. A node for dynamically splitting Traffic Engineering (TE) Label Switched Paths (LSPs) in a computer network, the node comprising:
one or more network interfaces;
a processor coupled to the one or more network interfaces and configured to execute software processes; and
a memory configured to store a TE process executable by the processor, the TE process configured to: i) determine that a TE-LSP to a destination needs to be sized to a larger bandwidth (a larger TE-LSP) than available bandwidth over a single path to the destination, in response ii) dynamically create a first split TE-LSP over a best available path, the first split TE-LSP reserving a maximum available bandwidth for the best available path, and iii) recursively create subsequent related split TE-LSPs for any remaining bandwidth of the larger TE-LSP over available paths until the larger TE-LSP can no longer be split.

18. The node as in claim 17, wherein the node is configured as a Path Computation Element (PCE).

19. A method comprising:
determining, by a node in a computer network, that a need exists to split a Traffic Engineering Label Switched Path (TE-LSP);
in response, dynamically splitting the TE-LSP into two or more related split TE-LSPs;
establishing a first split TE-LSP of the two or more related split TE-LSPs over a best available path;
establishing a second split TE-LSP of the two or more related split TE-LSPs over a next best available path;
routing higher priority traffic of the TE-LSP over the first split TE-LSP that is over the best available path; and
routing lower priority traffic of the TE-LSP over the second split TE-LSP that is over the next best available path.

20. The method as in claim 19, further comprising:
determining the best available path and the next best available path as paths that satisfy one or more metric constraints, at least one of the metric constraints selected from a group consisting of: an absolute maximum cost, an absolute maximum cost increase, a relative maximum cost increase, an absolute maximum delay, an absolute maximum delay increase, a relative maximum delay increase, an absolute maximum hop-count, an absolute maximum hop-count increase, and a relative maximum hop-count increase.

21. The method as in claim 19, further comprising:
determining the best available path and the next best available path as paths that have greater than a predetermined amount of a minimum bandwidth.

22. The method as in claim 19, further comprising:
re-grooming the two or more related split TE-LSPs in response to a re-grooming trigger to change the routing of traffic over at least one of the first split TE-LSP and the second split TE-LSP.

23. An apparatus comprising:
one or more network interfaces;
a processor coupled to the one or more network interfaces and configured to execute software processes; and
a memory configured to store a traffic engineering (TE) process executable by the processor, the TE process configured to: determine that a need exists to split a TE-LSP, split the TE-LSP into two or more related split TE-LSPs, establish a first split TE-LSP of the two or more related split TE-LSPs over a best available path, establish a second split TE-LSP of the two or more related split TE-LSPs over a next best available path, route higher priority traffic of the TE-LSP over the first split TE-LSP that is over the best available path, and route lower priority traffic of the TE-LSP over the second split TE-LSP that is over the next best available path.

24. The apparatus in claim 23, wherein the apparatus is a node configured as a Path Computation Element (PCE).

25. The method as in claim 6, wherein the larger TE-LSP can no longer be split when at least one event occurs from a group consisting of: reserving all remaining bandwidth of the TE-LSP, creating a maximum number of related split TE-LSPs, attempting a maximum number of available paths, and attempting all available paths.

26. The method as in claim 6, further comprising:
determining the best available path and next best available path as paths that satisfy one or more metric constraints, at least one of the metric constraints selected from a group consisting of: an absolute maximum cost, an absolute maximum cost increase, a relative maximum cost increase, an absolute maximum delay, an absolute maximum delay increase, a relative maximum delay increase, an absolute maximum hop-count, an absolute maximum hop-count increase, and a relative maximum hop-count increase.

27. The method as in claim 6, further comprising:
re-grooming the related split TE-LSPs in response to a re-grooming trigger to change the routing of traffic over at least one of the related split TE-LSPs.

28. The method as in claim 27, wherein the re-grooming trigger is selected from a group comprising: expiration of a configurable timer, a configurable increase in bandwidth along a path in the computer network, an added network element to the computer network, and a manual trigger.

29. The method as in claim 27, wherein the re-grooming re-grooms the related split TE-LSPs only if a predetermined gain over the related split TE-LSPs is achieved.

30. An apparatus comprising:
one or more network interfaces;
a processor coupled to the one or more network interfaces and configured to execute software processes; and
a memory configured to determine that a Traffic Engineering (TE) Label Switched Path (LSP) to a destination needs to be sized to a larger bandwidth than available bandwidth over a single path to the destination, and in response, to dynamically create a first related split TE-LSP over a best available path, the first split TE-LSP to reserve a maximum available bandwidth for the best available path and to recursively create subsequent related split TE-LSPs for any remaining bandwidth of the TE-LSP to the destination over next best available paths until the TE-LSP to the destination can no longer be split,
wherein the best and next best available paths are paths having greater than a configurable amount of a minimum bandwidth.

31. The apparatus in claim 30, wherein the apparatus is a node configured as a Path Computation Element (PCE).

* * * * *